(12) United States Patent
Okajima et al.

(10) Patent No.: US 6,529,455 B1
(45) Date of Patent: Mar. 4, 2003

(54) DISK APPARATUS WITH ENHANCED FOCAL POSITIONING

(75) Inventors: Tadashi Okajima, Yao (JP); Toshihide Hamaguchi, Higashiosaka (JP); Koichi Tada, Motosu-gun (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 127 days.

(21) Appl. No.: 09/642,935

(22) Filed: Aug. 22, 2000

(30) Foreign Application Priority Data

Aug. 24, 1999 (JP) .......................................... 11-236380

(51) Int. Cl.[7] ................................................. G11B 7/00
(52) U.S. Cl. ................................ 369/44.25; 369/44.26; 369/53.28
(58) Field of Search .......................... 369/44.25, 44.26, 369/44.29, 53.28

(56) References Cited

U.S. PATENT DOCUMENTS

| | | | | |
|---|---|---|---|---|
| 5,966,357 A | * | 6/1997 | Ryoo | 369/44.25 |
| 5,771,214 A | * | 6/1998 | Saga | 369/44.29 |
| 6,208,597 B1 | * | 3/2001 | Yoshimi | 369/44.29 |
| 6,256,273 B1 | * | 7/2001 | Matsuda et al. | 369/44.26 |

FOREIGN PATENT DOCUMENTS

| | | |
|---|---|---|
| EP | 0 420 475 A2 | 4/1991 |
| EP | 0 532 246 A2 | 3/1993 |
| EP | 0 840 304 A1 | 5/1998 |
| JP | 2-263329 | 10/1990 |

\* cited by examiner

*Primary Examiner*—Nabil Hindi
(74) *Attorney, Agent, or Firm*—Armstrong, Westerman & Hattori, LLP (57) ABSTRACT

A disk apparatus includes a DSP core, and executes processing for focal point positioning when turning on the power to the apparatus main body or exchanging the MO disk. The DSP core detects maximum and minimum values of outputs (focus error signal) of an FE signal detector circuit while moving the objective lens from an uppermost position of not contacted with a disk surface to a lowermost position. The DSP core calculates a middle position using positions of the objective lens upon fetching maximum and minimum values (uppermost and lowermost positions). Subsequently, the DSP core determines a range narrower than a range to be determined by the uppermost and lowermost positions, by the use of the middle point and amount of surface deflection of the MO disk. Then, the DSP core wobbles the objective lens within the narrow range and detects a focal point based on a level of the focus error signal.

5 Claims, 9 Drawing Sheets

DISK APPARATUS WITH ENHANCED FOCAL POSITIONING

BACKGROUND OF THE INVENTION

1. Field of the Invention

This invention relates generally to disk apparatuses and, more particularly, to a disk apparatus which illuminates laser light to a disk, such as an MO (Magneto-Optical) disk to record and/or reproduce signals.

2. Description of the Prior Art

In the conventional disk apparatus of this kind, when turning on the power to the apparatus main body or exchanging a disk, the objective lens provided on an optical pickup is moved from its lowermost position to an uppermost position to thereby detect a focal point of the objective lens. Incidentally, the objective lens may be moved from the upper-most to the lowermost position. After positioning the objective lens in a focal point, focus servo and tracking servo processing is carried out to allow the objective lens to follow the track.

However, in the prior art, the objective lens is gradually moved from its lowermost position to the uppermost position in order to perform focus servo in a position where the focus error signal becomes nearly zero. Due to this, it takes a long time before carrying out focus servo. In addition, there exists surface deflection in the disk. Consequently, in the event that the objective lens moving from the lowermost to uppermost position is unsuccessfully introduces a track, there is a need of performing again the operation for detecting a focal point from the beginning.

SUMMARY OF THE INVENTION

Therefore, it is a primary object of the present invention to provide a disk apparatus that positioning is made to a focal point in a brief time.

The present invention is a disk apparatus, comprising: a laser for emitting laser light; an objective lens for converging and illuminating laser light to a disk surface; producing means for producing a focus-related signal based on laser light reflected upon the disk surface; first moving means for moving the objective lens within a first range with respect to a focussing direction; determining means for determining a second predetermined range including a focal position and narrower than the first predetermined range, based on the focus-related signal produced upon moving the objective lens within the first predetermined range; second moving means for repeatedly moving the objective lens within the second predetermined range; and detecting means for detecting the focal position based on the focus-related signal produced upon moving the objective lens within the second predetermined range.

In this disk apparatus, the laser light emitted from the laser is converged by the objective lens and illuminated to a disk recording/reproducing surface. A focus-related signal is produced based on the light reflected upon the disk recording/reproducing surface. The determining means determines a second predetermined range narrower than a first predetermined range including a focal point, based on the focus-related signal produced upon moving the objective lens in the first predetermined range. Then, the detecting means detects a focal point based on the focus-related signal when moving the objective lens in the second predetermined range. That is, high-speed focus servo is possible to apply because the objective lens is moved in the second predetermined range narrower than the first predetermined range. Also, because of movement repetition, it is possible to detect a focal point without requiring redoing focal positioning operation from the beginning even where focal point is difficult to detect due to surface deflection of the disk.

According to this invention, because a focal point is detected by moving the objective lens in the second predetermined range narrower than the first predetermined range, focal positioning is possible in a brief time.

Also, the repetition of movement in the second predetermined range makes it possible to detect a focal point without redoing focal positioning operation from the beginning even where a focal point is difficult to detect due to surface deflection of the disk.

In one aspect of the invention, error signal producing means performs predetermined operation processing on outputs of the plurality of photodetector elements to produce a focus error signal, and the detecting means detects a focal point based on the focus error signal.

In one embodiment of the invention, first lens position detecting means detects a first lens position where the focus error signal is minimized in level, and second lens position detecting means detects a second lens position where the focus error signal is maximized in level. Calculating means calculates a middle point of the first lens position and the second lens position, and second predetermined range determining means determines as the second predetermined range a range having the middle position as a center and narrower than the first predetermined range.

In another embodiment of the invention, adding signal producing means produces an addition (SUM) signal. A second predetermined range is determined using the SUM signal.

In still another embodiment of the invention, when the objective lens moves in the first predetermined range, particular lens position detecting means detects two lens positions where the SUM signal level is a predetermined level. The calculating means calculates an approximate middle point using the two lens positions, and the determining means determines the second predetermined position including the middle point.

In yet another embodiment of the invention, the second predetermined range is related to an amount of surface deflection of the disk. That is, the second predetermined range is a range to be determined by adding or subtracting an absolute value of a surface deflection amount by the use of the middle point as a center.

In another embodiment of the invention, once the second predetermined range is determined, absolute value detecting means detects an absolute value of the focus error signal when the objective lens moves in one direction. Enabling means enables focus servo when the absolute value after exceeding the first predetermined value goes below the second predetermined value. Thus, the objective lens can be positioned to a focal point.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
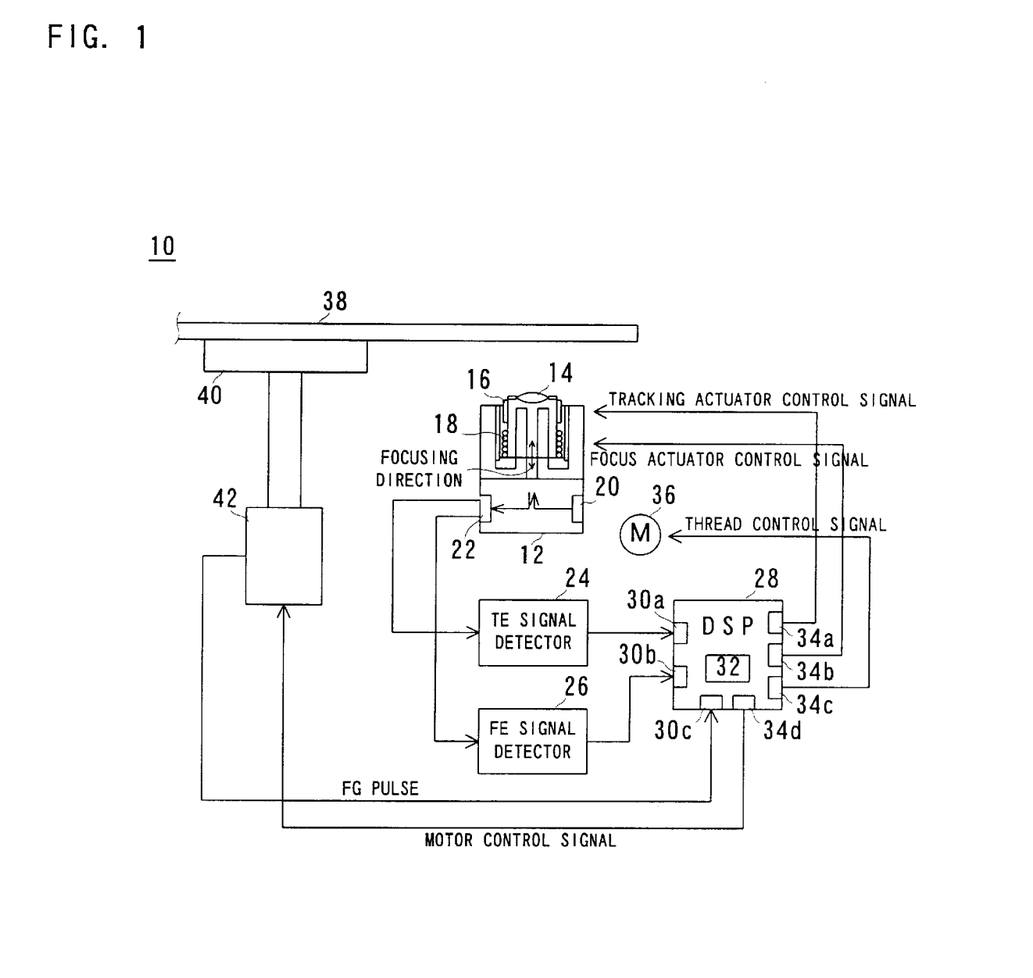
FIG. 1 is an illustrative view showing one embodiment of the present invention.

Referring to FIG. 1, a disk apparatus 10 of this embodiment includes an optical pickup 12. The optical pickup 12 includes an optical lens (objective lens) 14. The objective lens 14 is supported by a tracking actuator 16 and focus actuator 18. Consequently, the laser light emitted from a laser diode 20 is converged through the objective lens 14 and illuminated onto a recording/reproducing surface of a magneto-optical disk (MO disk) 38. This provides writing of a desired signal to the MO disk 38 or reading of a desired signal out of the MO disk 38. Incidentally, the optical pickup 12 is coupled to a thread motor 36, for example, by a rack-and-pinion scheme and hence can be moved in a radial direction of the MO disk 38.

The laser light reflected upon the disk surface (reflection light) passes through the objective lens 14 and illuminated to a photodetector 22. The photodetector 22 has an output to be inputted to the TE signal detector circuit 24 and the FE signal detector circuit 26 to respectively detect a TE signal (tracking error signal) and an FE signal (focus error signal). The detected TE and FE signals are respectively delivered to A/D converters 30a and 30b provided in a DSP (Digital Signal Processor).

Figure 2:
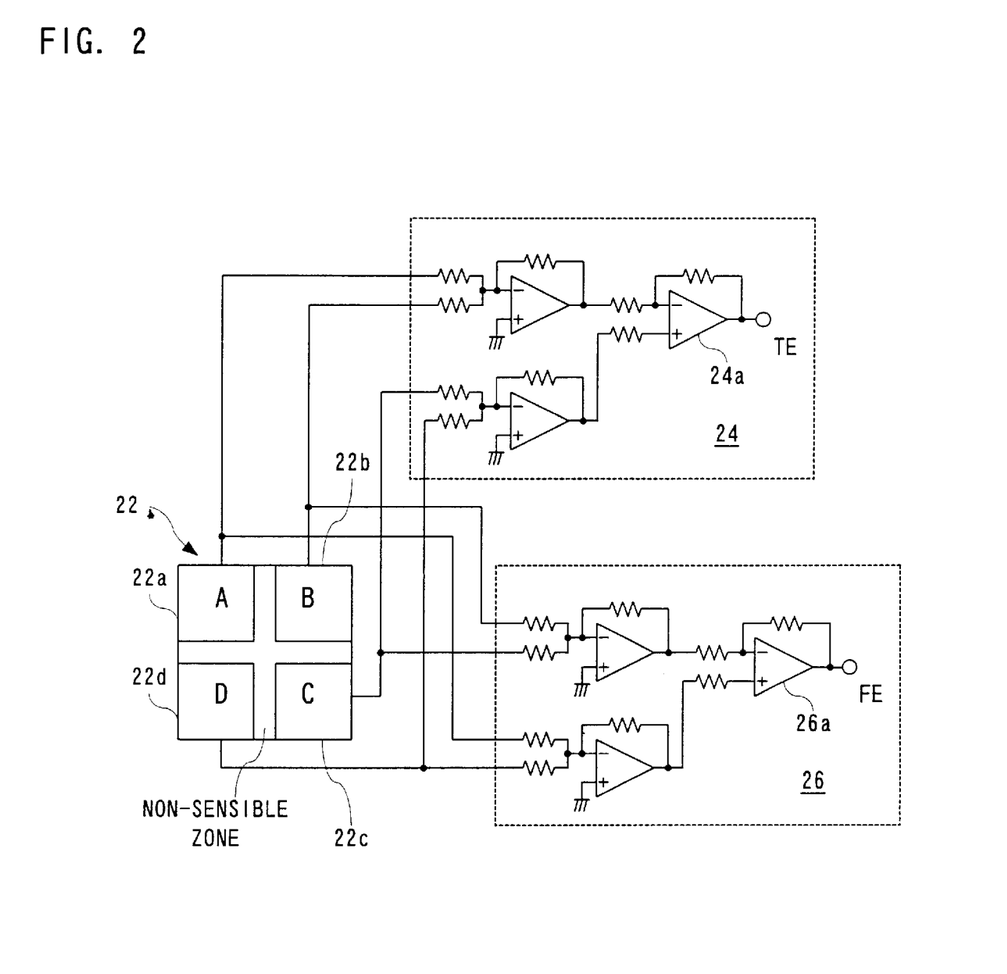
FIG. 2 is an illustrative view showing a photodetector, a TE signal detector circuit and an FE signal detector circuit shown in the FIG. 1 embodiment.

Meanwhile, the photodetector 22, the TE signal detector circuit 24 and the FE signal detector circuit 26 are to be illustrated as in FIG. 2. The photodetector 22 is divided into four zones of A, B, C and D. These photodetector elements 22a–22d, in pairs, are electrically connected one another. Also, the photodetector elements 22a–22d have respective outputs to be inputted to the TE signal detector circuit 24 and FE signal detector circuit 26. The respective circuits carry out predetermined operations. An error amplifier (hereafter merely referred to as "amplifier") 24a outputs a TE signal while an amplifier 26a outputs an FE signal. That is, the TE signal outputted from the amplifier 24a, if shown with outputs of the photodetectors 22a–22d, is to be expressed as Equation 1. Incidentally, the outputs of the photodetectors 22a–22d corresponding to the zones A–D are denoted by the same characters as those of the zones A–D.

$$TE\ \text{signal} = (A+B) - (C+D) \quad \text{[Equation 1]}$$

Also, the FE signal outputted from the amplifier 26a, if shown similarly with the outputs of the photodetectors 22a–22d, is to be expressed as Equation 2.

$$FE\ \text{signal} = (B+C) - (A+D) \quad \text{[Equation 2]}$$

Furthermore, the MO disk 38 is fixedly rested on a turntable 40 and rotated together with the turntable 40 by a spindle motor 42. The spindle motor 42 generates an FG pules related to r.p.m. The FG pulse is supplied to an A/D converter 30c of the DSP 28. Incidentally, the MO disk 38 is a constant-linear-velocity (CLV) schemed disk, and the r.p.m. of the spindle motor 42 decreases as the optical pickup 12 moves toward the outer periphery thereof.

The TE, FE and FG signals thus supplied to the A/D converters 30a–30c are converted into digital signals and then inputted to the DSP core 32. The DSP core 32 executes tracking servo processing based on the TE signal, focus servo processing based on the FE signal, and spindle servo processing based on the FG signal.

The tracking servo processing produces a tracking actuator control signal and a thread control signal whereby the corresponding PWM signals are outputted respectively from the PWM drivers 34a and 34c to the tracking actuator 16 and the thread motor 36. Also, the focus servo processing produces a focus actuator control signal thereby outputting the corresponding PWM signal from a PWM driver 34b to the focus actuator 18. Furthermore, the spindle servo processing produces a spindle motor control signal, thereby outputting the corresponding PWM signal from a PWM driver 34d to the spindle motor 42.

In this manner, a tracking servo system is formed by the TE signal detector circuit 24, the DSP 28, the tracking actuator 16 and the thread motor 36. Thus, the objective lens 14 is properly controlled of tracking based on the TE signal. Also, a focus servo system is formed by the FE signal detector circuit 26, the DSP 28 and the focus actuator 18. Based on the FE signal, the objective lens 14 is properly controlled of focussing. Furthermore, a spindle servo system is formed by the spindle motor 42 and the DSP 28. Based on the FG signal, the spindle motor 42, or MO disk 38, is properly controlled of rotation. As a result, the laser light outputted from the laser diode 20 is illuminated in a desired light quantity to a desired track (not shown). Thus, a signal is recorded to the disk surface or a signal is read out of the disk surface.

In the disk apparatus 10, when turning on the power to the apparatus main body or exchanging the MO disk 38, processing is executed to position the objective lens 14 to a focal point. That is, after positioning the objective lens 14 to a focal point, it is possible to accurately follow the objective lens 14 over a track by executing focus servo processing and tracking servo processing. Incidentally, when positioning processing is being executed, focus servo processing is off (disabled).

Figure 3:
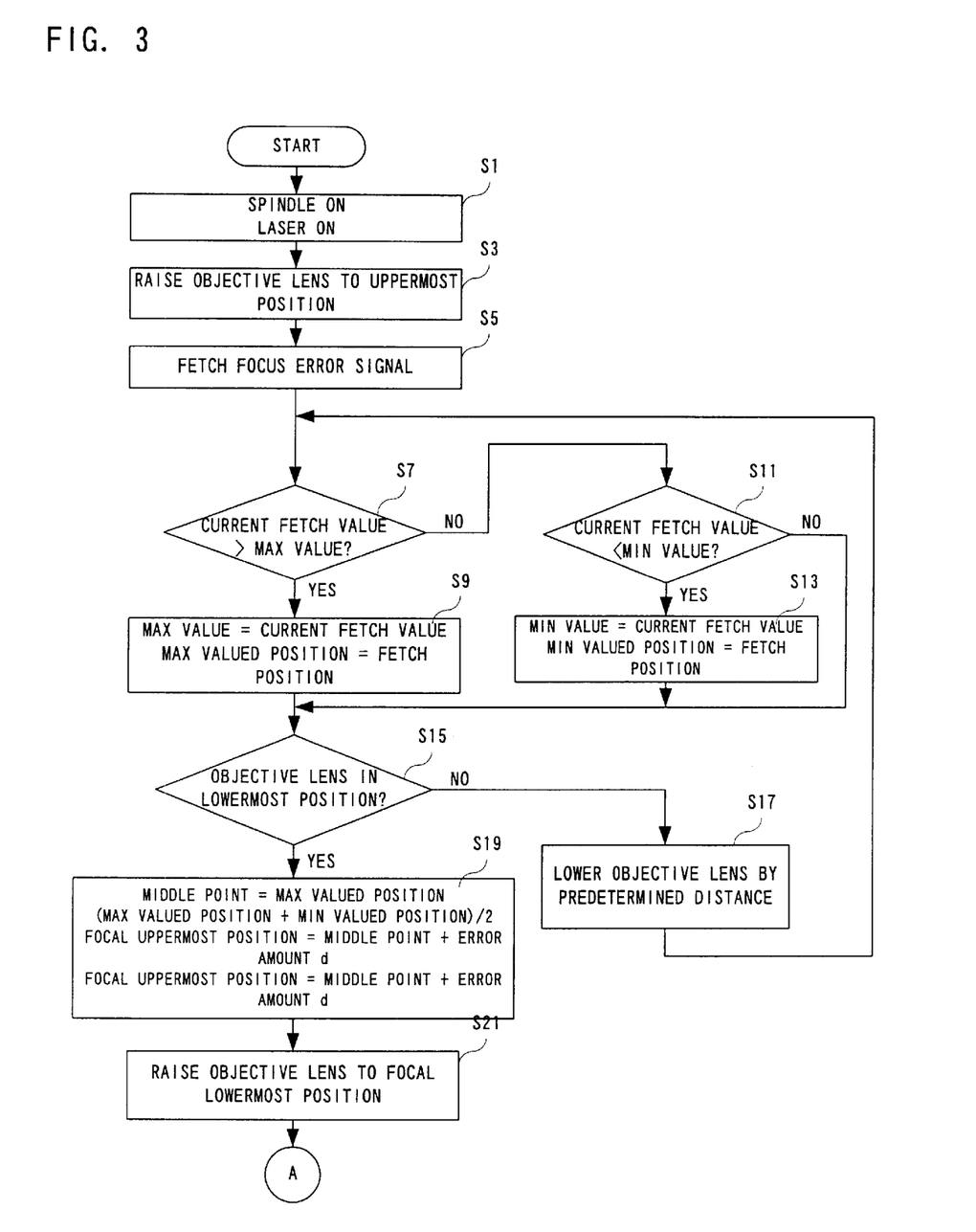
FIG. 3 is a flowchart showing one part of processing in a DSP core shown in the FIG. 1 embodiment.
Figure 4:
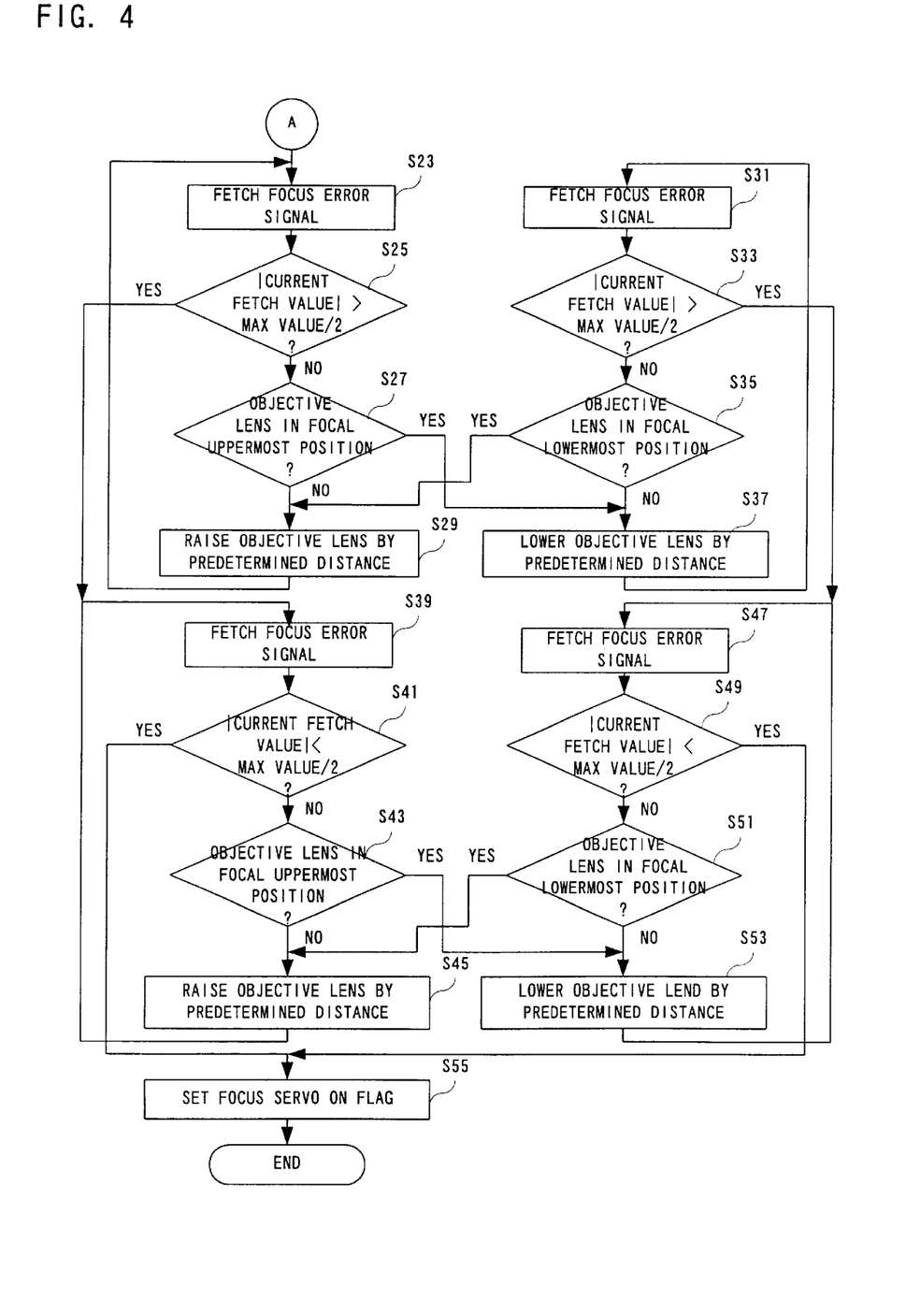
FIG. 4 is a flowchart showing another part of processing in the DSP core shown in the FIG. 1 embodiment.

Specifically, the DSP core 32 processes a flowchart shown in FIG. 3 and FIG. 4. As described above, if the power to the apparatus main body is turned on or MO disk 38 is exchanged, the DSP core 32 starts processing. In step S1, the spindle motor 42 and the laser diode 20 are turned on. In the succeeding step S3, the focus actuator 18 is driven in a focussing direction to raise the objective lens 14 to an uppermost position where it is not contacted with the MO disk 38. If the objective lens 14 is raised to the uppermost position, in step S5 is fetched a focus error signal at the upper most position.

In the succeeding step S7 it is determined whether the currently-fetched focus error signal is greater than a maximum value or not. Incidentally, in this embodiment, the maximum value in its initial value is set 0. In step S7, if "YES", i.e. the currently-fetched focus error signal is greater in value (fetch value) than a maximum value, in step S9 the currently-fetched value is substituted for the maximum value and the position of the objective lens 14 upon fetching (fetch position) is substituted for a position of the maximum value. Then, the process advances to step S15.

On the other hand, if "NO" in the step S7, i.e. the currently-fetched value is smaller than the maximum value, it is determined in step S11 whether the currently-fetched value is smaller than a minimum value or not. Incidentally, in this embodiment, the minimum value in its initial value is also set 0. If "YES" in the step S11, i.e. the currently-fetched value is smaller than the minimum value, the currently-fetched value is substituted for the minimum value in step S13 and a fetch position is substituted for a minimum value position. Then the process advances to step S15. On the other hand, if "NO" in the step S11, i.e. the currently-fetched value is greater than the minimum value, the process directly proceeds to step S15.

In the step S15 it is determined whether the objective lens 14 is in the lowermost position or not. That is, determined is whether it moved over a mechanically-drivable range or not. If "NO" here, the objective lens 14 is determined movable. In step S17 the objective lens 14 is lowered by a predetermined distance (in this embodiment, 1–2 $\mu$m) and then the process returns to the step S7. On the other hand, if "YES" in the step S15, i.e. it is determined moved in a mechanically-drivable range, in step S19 calculated is an approximate middle position from a maximum value position and minimum value position, determined is a value of the middle position added with an error amount d to be a focus uppermost position, and determined is a value of the middle position subtracted by the error amount d to be a focus lowermost position. Specifically, Equation 3 is operated.

middle point=(maximum-valued position+minimum-valued position)/2     [Equation 3]

focal uppermost position=middle point+error amount d focal lowermost position=middle point−error amount d Incidentally, in this embodiment, focal uppermost and lowermost positions are set including an error amount d in order to take into account deflection in the surface of the MO disk 38. Also, the error amount d is set to a maximum amount of surface deflection ($|\pm 0.1$ mm$|$) as determined in the disk rating.

Figure 5:
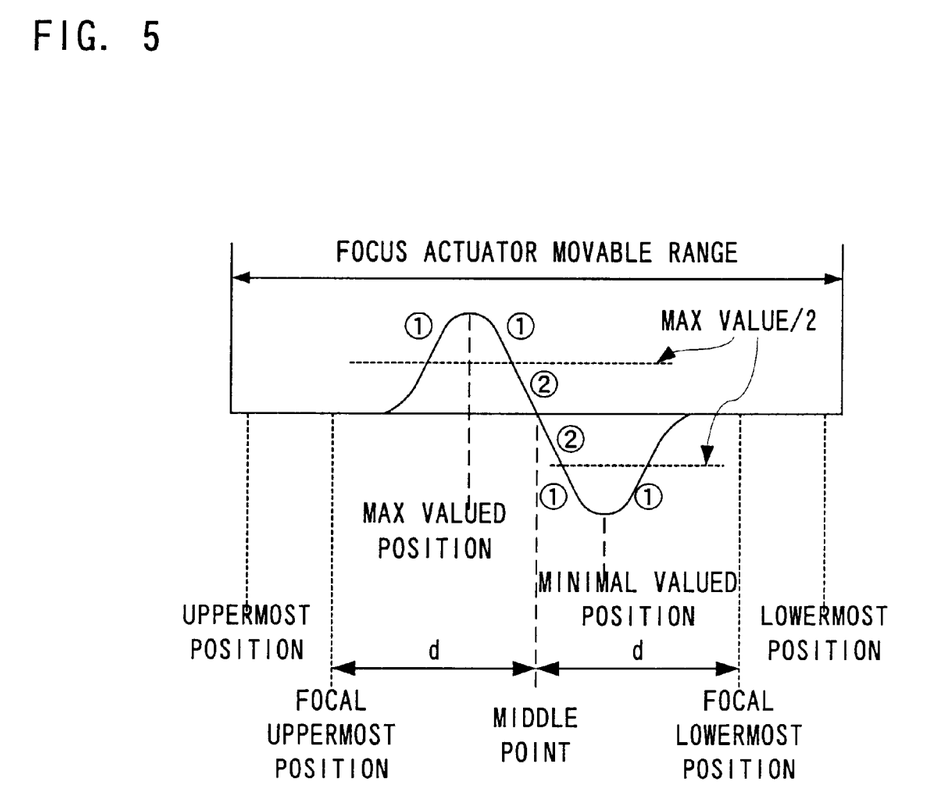
FIG. 5 is an illustrative view showing a level of a focus error signal for a position of the objective lens shown in the FIG. 1 embodiment.

That is, as shown in FIG. 5, the objective lens 14 is moved by a predetermined amount per time from the uppermost to the lowermost position within a movable range (focus actuator movable range). In this duration, detected are maximum and minimum values of fetch vales as well as fetch positions thereof (maximum value position and minimum value position). Incidentally, the range to be determined by the uppermost and lowermost positions of the objective lens 14 is somewhat smaller than the focus actuator movable range. From detected maximal and minimal value positions, an approximate middle point is calculated. Using the error amount d, focal uppermost and lowermost positions are determined. That is, determined is a range narrower than a range to be determined by the uppermost and lowermost positions. A focal point is detected within this narrow range.

Specifically, in step S21 the objective lens 14 is moved (raised) to the focal lowermost position. Subsequently, in step S23 shown in FIG. 4, a focus error signal is fetched to determine in step S25 whether the currently fetched value in its absolute value is greater than a half of the maximum value determined in the step S9 or not. If "YES" in step S25, i.e. the currently fetched value in absolute value is greater than a half of the maximum value, then the process advances to step S39. On the other hand, if "NO" in the step S25, i.e. the currently fetched value in absolute value is smaller than a half of the maximum value, then it is determined in step S27 whether the objective lens 14 is in the focal uppermost position or not. If "NO" in the step S27, i.e. not in the focal uppermost position, in step S29 the object lens 14 is raised by a predetermined distance and then the process returns to the step S25.

On the other hand, if "YES" in the step S27, i.e. in the focal uppermost position, in step S37 the objective lens 14 is lowered by a predetermined distance from the focal uppermost position and then the process returns to the step S31. In the step S31, a focus error signal is fetched to determine in step S33 whether the currently fetched value in its absolute value is greater than a half of the maximum value or not. If "YES" in the step S33, i.e. the currently fetched value in absolute value is greater than a half of the maximum value, then the process proceeds to step S47. On the other hand, if "NO" in the step S33, i.e. the currently fetched value in absolute value is smaller than a half of the maximum value, it is determined in step S35 whether the objective lens 14 is in the focal lowermost position or not. If "NO" in the step S35, i.e. not in the focal lowermost position, the process advances to step S37. On the other hand, if "YES" in the step S35, i.e. the objective lens 14 is in the focal lowermost position, then the process returns to the step S29. In this manner, the steps S39 and S47 are not entered until the absolute currently fetched value becomes greater than a half of the maximum value. That is, the objective lens 14 is repeatedly moved up and down between the focal uppermost and lowermost positions (wobbling).

In step S39 a focus error signal is fetched, and it is determined in the following step S41 whether the currently fetched value in its absolute value is smaller than a half of the maximum value or not. If "YES" in step S41, i.e. the absolute currently-fetched value is smaller than a half of the maximum value, it is determined that focus servo is possible to apply. Accordingly, in step S55, a flag for turning on focus servo is set, i.e. the objective lens 14 is positioned in the focal point and the process is ended. The reason of turning on (enabling) focus servo processing where the absolute fetched value is smaller than a half of the maximum value, is because focussing is possible due to focus servo where the fetched value is smaller than a half of the maximum value. On the other hand, if "NO" in step S41, it is determined that focus servo is impossible to apply. In step S43 it is determined whether the objective lens 14 is in the focal uppermost position or not. If "NO" in the step S43, i.e. not in the focal uppermost position, in step S45 the objective lens 14 is raised by a predetermined distance and the process returns to the step S39. On the other hand, if "YES" in the step S43, i.e. in the focal uppermost position, in step S53 the objective lens 14 is lowered by a predetermined distance and the process advances to step S47.

In step S47 a focus error signal is fetched, and in step S49 it is determined whether the currently fetched value in its absolute value is smaller than a half of the maximum value or not. If "YES" in the step S49, it is determined that focus servo is possible to apply and then the process proceeds to step S55. On the other hand, if "NO" in the step S49, it is determined whether the objective lens is in the focal lowermost position or not. If "NO" in the step S51, i.e. not in the focal lowermost position, then the process proceeds to step S53. On the other hand, if "YES" in the step S51, i.e. in the focal lowermost position, the process proceeds to step S45.

That is, as shown in FIG. 5, after detecting in the steps S23 to S37 a range 1̂ of between a focal maximal position and a focal minimum position, i.e. a range of exceeding a level of a half of the absolute maximum value, detected in steps S39 to S53 is a range 2 where focus servo is possible to apply, i.e. a range below a level of a half of the absolute maximum value. Thus, focus servo is applied and the objective lens 14 is positioned to a focal point.

Figure 6:
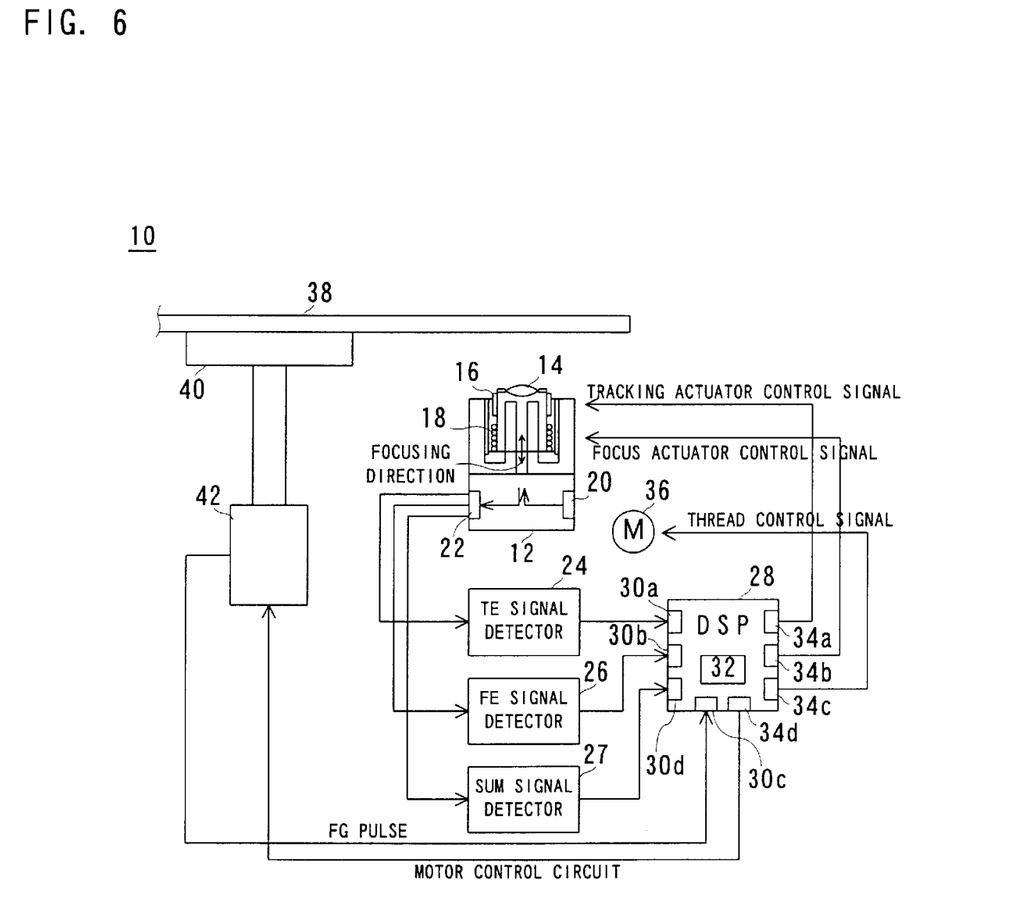
FIG. 6 is an illustrative view showing another embodiment of the present invention.

FIG. 6 shows another embodiment of a disk apparatus 10 which is the same as the FIG. 1 embodiment except for the further provision of a SUM (addition) signal detector circuit 27 and A/D converter 30d, hence duplicate explanations being omitted.

Figure 7:
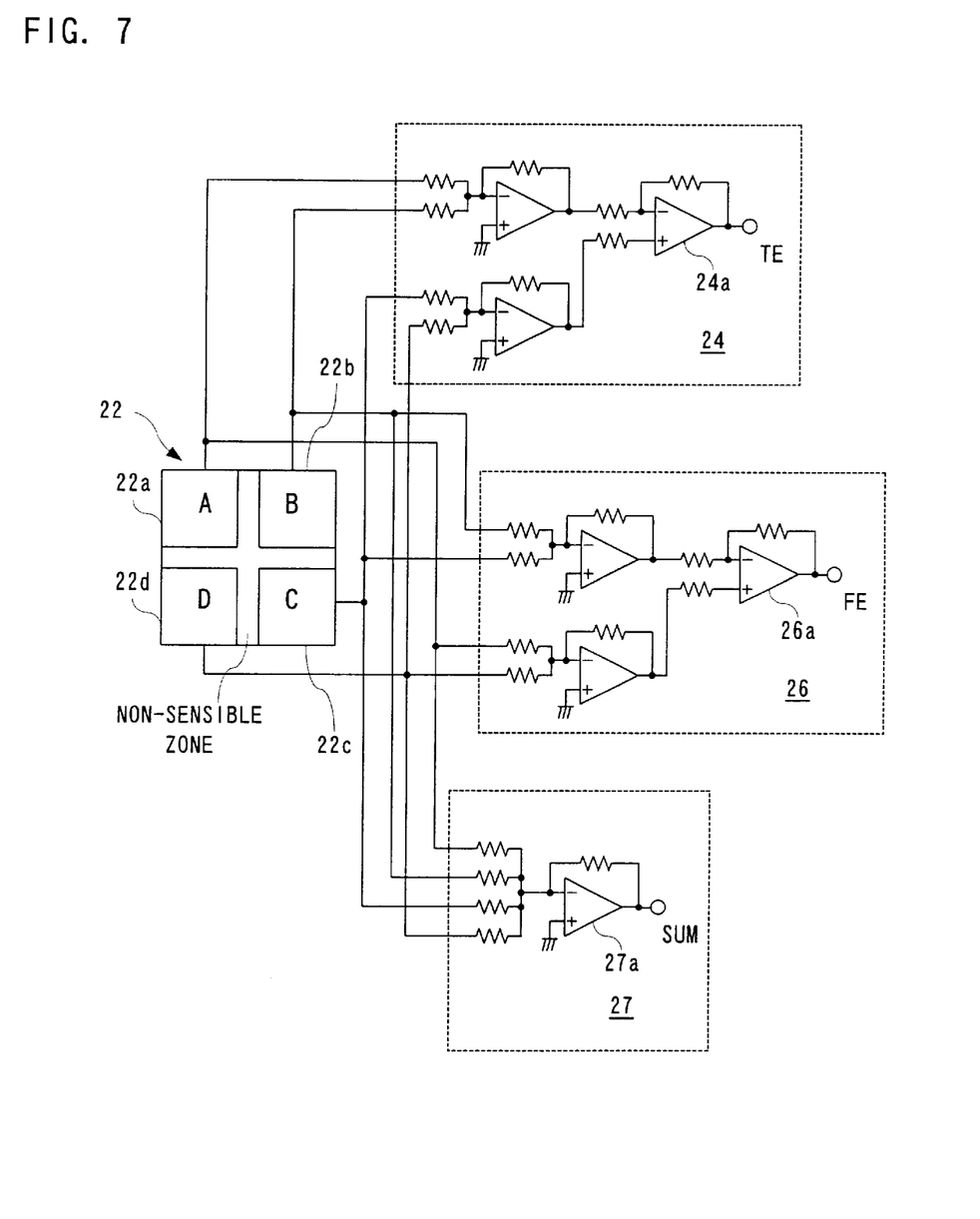
FIG. 7 is an illustrative view showing a photodetector, a TE signal detector circuit, an FE signal detector circuit and a SUM signal detector circuit shown in the FIG. 6 embodiment.

Explaining a SUM signal in detail, a photodetector 22, a TE signal detector circuit 24, an FE signal detector circuit 26 and a SUM signal detector circuit 27 are shown in FIG. 7. That is, outputs of photodetector elements 22a–22d are inputted to the SUM signal detector circuit 27 and subjected to predetermined operation. Thus, a SUM signal is outputted from an amplifier 27a constituting the SUM signal detector circuit 27. Specifically, the SUM signal is expressed using outputs of the photodetectors 22a–22d by Equation 4. Incidentally, the outputs of the photodetectors 22a–22d are denoted by the same characters as the regions A–D, similarly to the before.

$$\text{SUM signal} = A + B + C + D \qquad \text{[Equation 4]}$$

The SUM signal is supplied to an A/D converter 32c provided in a DSP 28. In this disk apparatus 10 of the other embodiment, when turning on the main power to the apparatus main body or exchanging the disk 38, the DSP core 32 turns on the spindle motor 42 and the laser diode 20 similarly to the FIG. 1 embodiment, thereby raising the objective lens 14 to an uppermost position of not contacted with the MO disk 38. Then, in step S101 shown in FIG. 8, the SUM signal is fetched by the SUM signal detector circuit 27 based upon an output of the photodetector 22. The fetched SUM signal is converted into a digital signal by the AID converter 30d and applied to the DSP core 32. In the following step S103, it is determined whether the currently-fetched SUM signal value (fetch value) is equal to a predetermined level or not. If "YES" in the step S103, i.e. equal to a predetermined level, then in step S105 the fetch position is substituted for a position P (Q) and then the process advances to step S15. On the other hand, if "NO" in the step S103, i.e. not a predetermined level, then in step S17 the objective lens 14 is lowered by a predetermined distance (1–2 μm) and then the process returns to the step S101.

Figure 8:
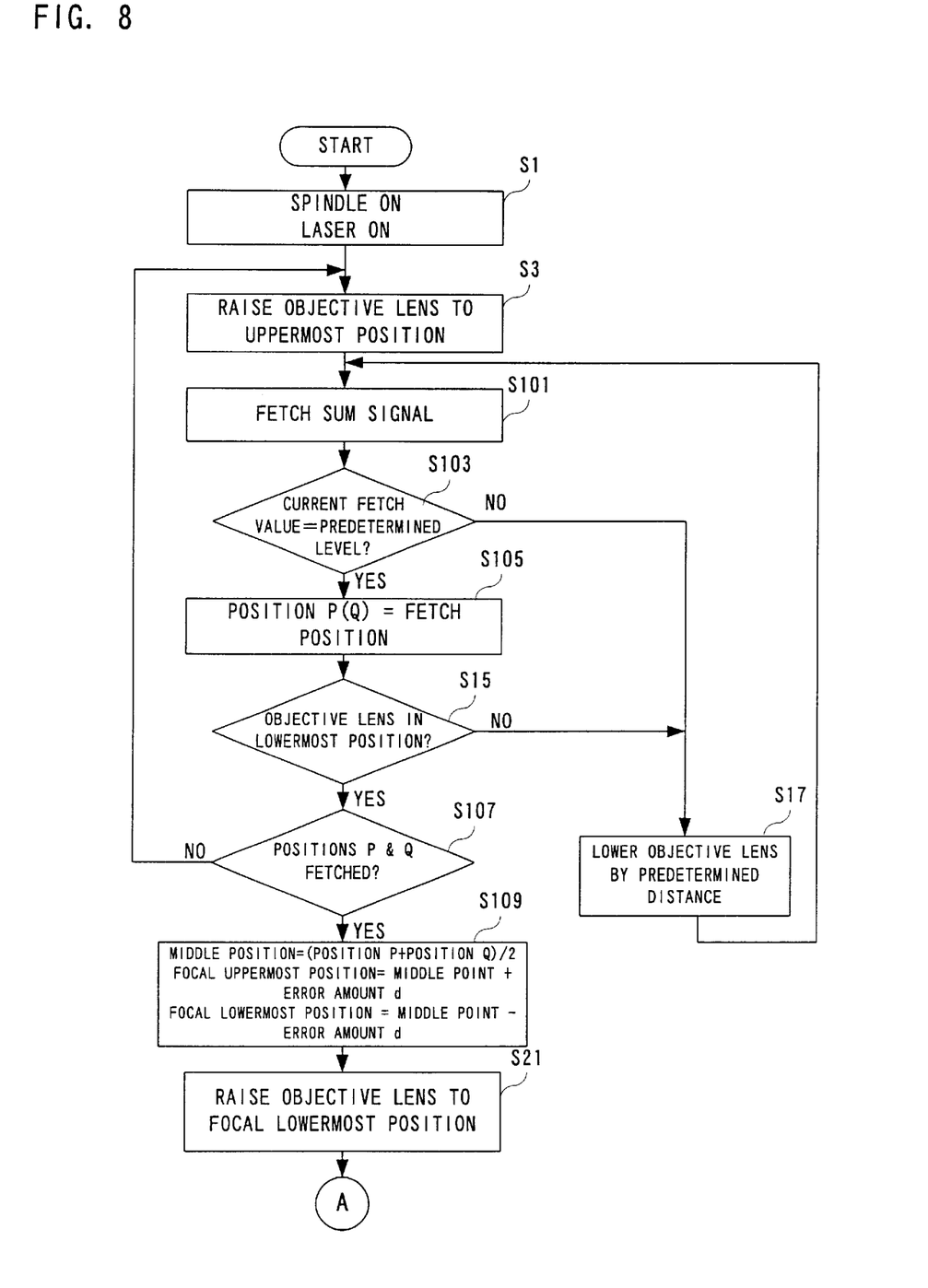
FIG. 8 is a flowchart showing one part of processing in a DSP core shown in the FIG. 6 embodiment.
Figure 9:
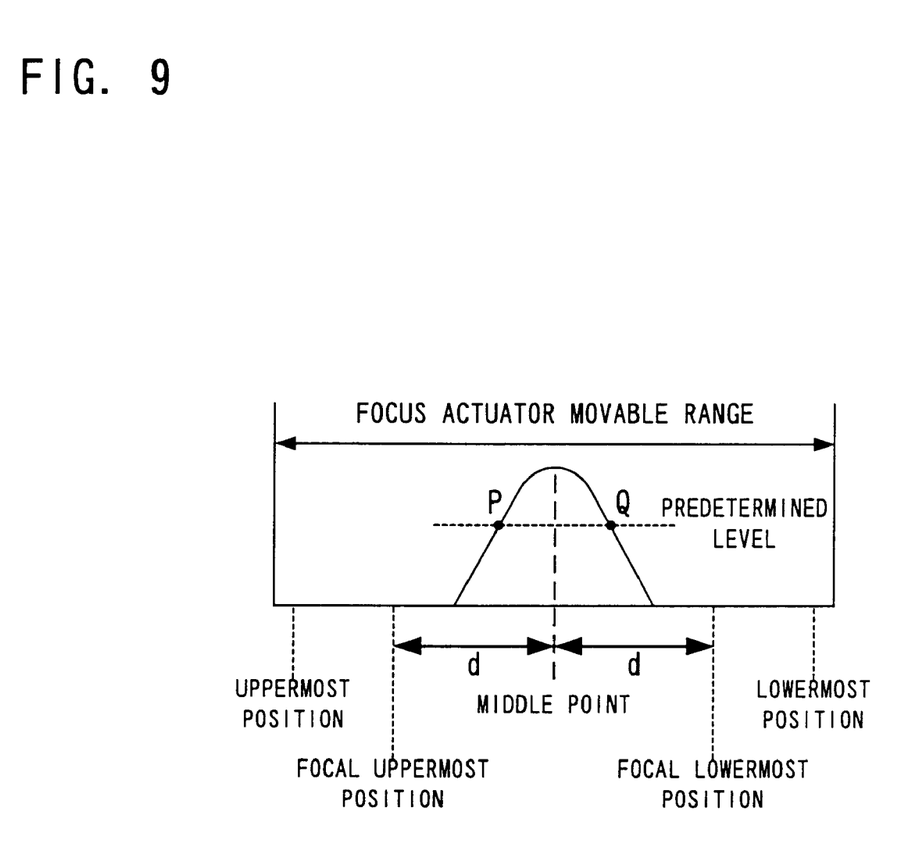
FIG. 9 is an illustrative view showing a level of a SUM signal for a position of the objective lens shown in the FIG. 6 embodiment.

In the step S15 it is determined whether the objective lens 14 is in the lowermost position or not. That is, determination is made whether the objective lens has moved from the uppermost position to the lowermost position or not. If "NO" in the step S15, it is determined that not having moved to the lowermost position and the process advances to step S17. On the other hand, if "YES" in the step S15, it is determined that having been moved to the lowermost position. In step S 107 it is determined whether positions P and Q have been fetched or not. If "YES" in the step S107, in step S109 the fetch positions P and Q are used to calculate a middle point and determine focal uppermost and lowermost positions including an error amount d, and the process proceeds to step S21. Specifically, in the step S109 Equation 5 is operated.

$$\text{neutral point} = (\text{position } P + \text{position } Q)/2 \qquad \text{[Equation 5]}$$
focal uppermost position = neutral point + error amount $d$
focal lowermost position = neutral point − error amount $d$ On the other hand, if "NO" in the step S107, it is determined that the values of positions P and Q have not been fetched. Returning to step S3, the operation of fetching the positions P and Q is again repeated.

That is, while the objective lens 14 is being moved from the uppermost position to the lowermost position, detected are two positions P and Q of the objective lens 14 corresponding to such a predetermined level as shown in FIG. 7. An approximate middle point is calculated from the two positions P and Q. Then, determined are focal uppermost and lowermost positions for which the amount of surface deflection (error amount d) is taken into account. That is, a range is determined which is narrower than a range to be determined by the uppermost and lowermost positions based on the SUM signal. Incidentally, because the SUM signal varies in wave height value due to variation in laser diode 20 power, various sensors (not shown) etc., the predetermined level may be held in a table having values previously obtained through experiments.

Subsequently, processing is made according to the flow-chart shown in FIG. 3, similarly to the FIG. 1 embodiment. That is, the objective lens 14 is wobbled within a range determined by the uppermost and lowermost focal positions, to thereby position the objective lens 14 in a focal point based on a level of the focus error signal.

According to these embodiments, because the objective lens is wobbled within a range narrower than the movable range of the actuator, positioning to a focal point is possible in a brief time. Also, in the case where a focal point is difficult to detect due to surface deflection of the MO disk 38, wobbling makes it possible to detect a focal point without re-performing positioning operation from the beginning.

Incidentally, the MO disk shown in this embodiment includes an ASMO (Advanced-Storage Magneto-Optical) disk.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A disk apparatus, comprising:

a laser for emitting laser light;

an objective lens for converging and illuminating laser light to a disk surface;

producing means for producing a focus-related signal based on laser light reflected upon the disk surface;

first moving means for moving said objective lens within a first range with respect to a focusing direction;

determining means for determining a second predetermined range including a focal position and narrower than the first predetermined range, based on the focus-related signal produced upon moving said objective lens within the first predetermined range;

second moving means for repeatedly moving said objective lens within the second predetermined range;

detecting means for detecting the focal position based on the focus-related signal produced upon moving said objective lens within the second predetermined range;

said producing means includes a plurality of photodetector elements and error signal producing means for performing predetermined operation processing on outputs of said plurality of photodetector elements to produce a focus error signal; and said detecting means detecting a focal point based on the focus error signal;

wherein said determining means includes first lens position detecting means to detect a first lens position where the focus error signal is minimized in level, second lens position detecting means to detect a second lens position where the focus error signal is maximized in level, calculating means to calculate a middle point of the first lens position and the second lens position, and second predetermined range determining means to determine as the second predetermined range a range having the middle position as a center and narrower than the first predetermined range.

2. A disk apparatus according to claim 1, wherein said producing means further includes adding means to add together outputs of said plurality of photodetector elements and produce an addition signal, and said determining means determining the second predetermined range based on the position signal.

3. A disk apparatus according to claim 2, wherein said determining means includes particular lens position detecting means to detect two lens positions where the addition signal in level is a predetermined level, calculating means to calculate a middle position of the two lens positions, and second predetermined range determining means to determine as the second predetermined range a range having the middle position as a center and narrower than the first predetermined range.

4. A disk apparatus according to claim 1, wherein the second predetermined range is related to an amount of surface deflection of said disk.

5. A disk apparatus according to claim 1, wherein said detecting means includes absolute value detecting means to detect an absolute value of the focus error signal when said objective lens moves in one direction, first comparing means to compare the absolute value with a first predetermined value, second comparing means to compare the absolute value with the second predetermined value after the absolute value exceeds the first predetermined value, and enabling means to enable focus servo when the absolute value goes below the second predetermined value.

* * * * *